March 20, 1934.  D. D. ROCK  1,951,441
SOLDERING APPARATUS
Filed Nov. 12, 1930
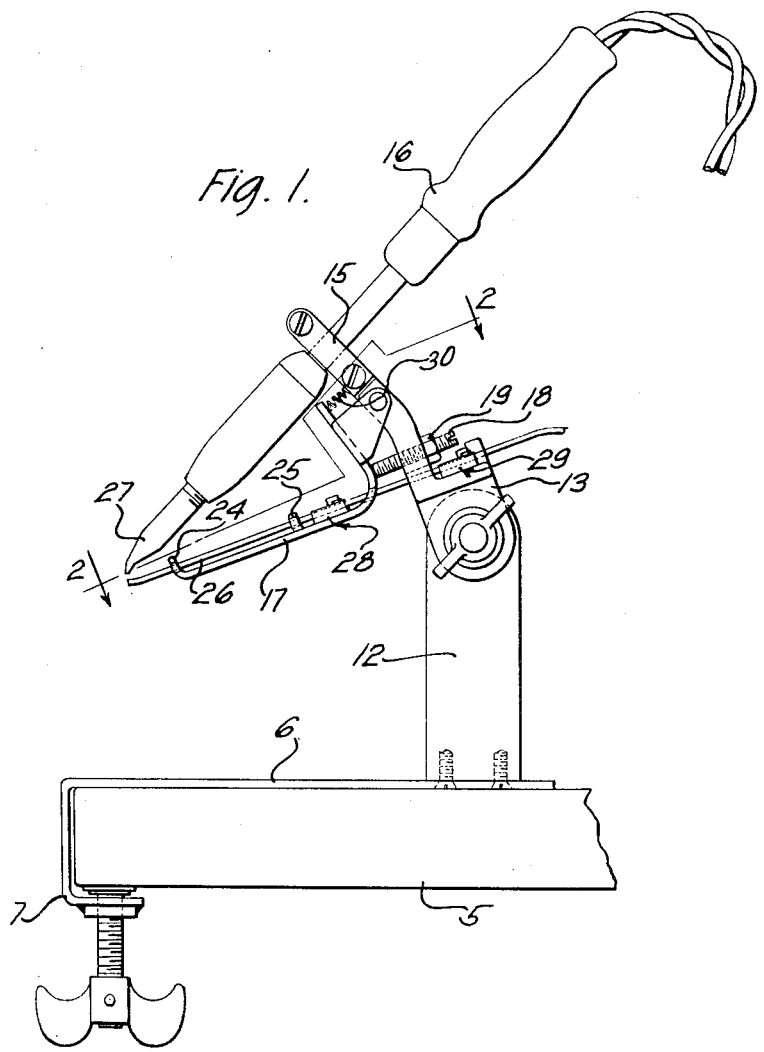
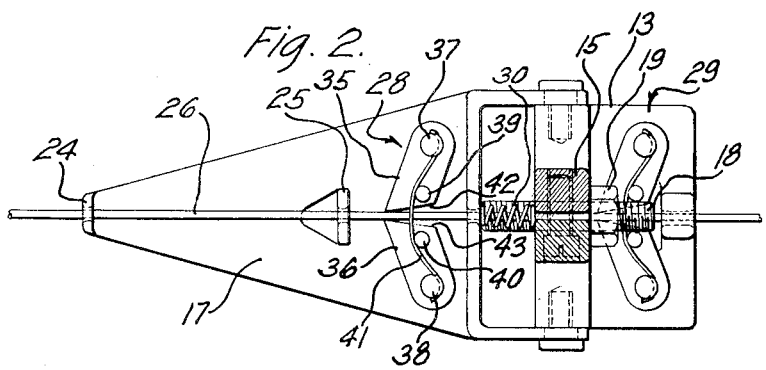
Inventor
D. D. Rock
By H. B. Whitfield Atty.

Patented Mar. 20, 1934

1,951,441

UNITED STATES PATENT OFFICE 1,951,441

SOLDERING APPARATUS

Darrell D. Rock, Cicero, Ill., assignor to Western Electric Company, Incorporated, New York, N. Y., a corporation of New York Application November 12, 1930, Serial No. 495,094

3 Claims. (Cl. 113—109)

This invention relates to soldering apparatus, and more particularly to a wire solder feeding device operatively associated with a soldering iron or the equivalent thereof.

An object of this invention is to provide a solder feeding apparatus readily applied to soldering irons for feeding predetermined quantities of solder, thereby materially expediting soldering operations.

In accordance with one embodiment, the invention contemplates a feeding apparatus applied to a stationary soldering iron which withdraws from a supply of wire solder a predetermined length thereof upon its movement into engagement with the soldering iron by the articles being soldered, and which makes that length of solder available for a subsequent soldering operation upon its restoration to normal position. This predetermined, intermittent feed is achieved by a pair of sets of gripping jaws one of which is mounted upon a stationary member, and the other of which is mounted upon an oscillatable advancing member. Upon movement of the oscillatable member, due to the article which is being soldered engaging the wire solder, a section of wire solder will be drawn through gripping jaws mounted upon the stationary member and upon movement in the opposite direction, after a piece of wire solder has been melted, the withdrawn section will be advanced through the gripping jaws mounted on the oscillatable member, because it is held against movement in the reverse direction by the action of the other set of gripping jaws. Regulation of the amount of travel of the oscillatable member and thereby the quantity of solder fed to the tip of the soldering iron at each movement of the oscillatable member may be accomplished by adjusting a set screw.

A better understanding of the invention will be had by referring to the following detailed description, taken in conjunction with the accompanying drawing, wherein Fig. 1 is a side elevational view of apparatus embodying the features of the present invention, and Fig. 2 is an enlarged sectional view taken on the line 2—2 of the Fig. 1 in the direction of the arrows.

Referring now to the drawing wherein like reference characters designate the same parts throughout the several views, the numeral 5 indicates a work table upon which the apparatus, embodying the invention, may be mounted. The apparatus comprises a base 6 provided with clamping means 7 for securing the apparatus to the table 5. Secured to the base 6 and extending upwardly therefrom is a standard 12 having adjustably secured thereto a supporting bracket 13 which may be adjusted and locked in any angular position upon the standard 12 by means of a wing nut.

The supporting bracket 13 has mounted at the upper end thereof, by means of a clamp 15, a soldering iron 16 of any known type, and has pivotally mounted intermediate the ends thereof an oscillatable member 17, the amount of oscillation of which may be regulated by means of a set screw 18 provided with a locking nut 19. The oscillatable member 17 has a pair of wire solder guides 24 and 25 formed integral therewith through which a cored wire solder 26 from a supply (not shown) may be directed to the tip portion 27 of the soldering iron 16. A coil spring 30 normally urges the oscillatable member 17 about its pivot to move the wire solder 26 away from the tip portion 27 of the soldering iron.

Pivotally mounted upon the oscillatable member 17 is a set of gripping jaws 28 adapted to grip firmly the wire solder 26 between beveled portions thereof in such a manner as to prevent its movement to the right (Fig. 1) while permitting it to be moved to the left as viewed in Fig. 2. A similar set of gripping jaws 29 are pivotally mounted upon the supporting bracket 13.

For the sake of simplifying the disclosure only one set of gripping jaws will be described, the construction and operation thereof being exactly the same for both sets of gripping jaws 28 and 29. Referring now to Fig. 2, the gripping jaws designated generally by the numeral 28 comprise a pair of jaws 35 and 36 pivotally mounted on pins 37 and 38 respectively, carried by the oscillatable member 17. The jaws 35 and 36 have studs 39 and 40, respectively, mounted thereon in engagement with a spring 41, the ends of which are secured to the pins 37 and 38, and the adjacent ends of the jaws 35 and 36 are beveled as shown at 42 and 43, respectively, so as to permit the wire solder 26 to be moved to the left while restraining it from movement to the right (Fig. 2).

A better understanding of the invention may be had by reference to the following brief description of the operation thereof. An operator desiring to solder a piece of wire to a terminal of a piece of electrical apparatus (not shown), may position these parts in engagement with the left end (Fig. 1) of the wire solder 26, and move the parts with the wire solder 26 and the oscillatable member upwardly until the wire solder engages the heated tip 27 of the soldering iron 16, and in so doing the solder will be melted. The movement of the wire solder 26 upwardly will move the oscillatable member 17 about its pivot, thus causing the set of gripping jaws 28 to move in an arcuate path, and in view of the construction of jaws 29 which allow movement of the wire solder in only one direction, a predetermined amount of solder will be withdrawn from the supply and through the jaws 29 to a position between the jaws 28 and the jaws 29. When the wire solder is melted due to its engagement with tip 27 of soldering iron 16, the oscillatable member 17 will move downwardly due to gravity and the action of the spring 30 to advance the additional wire which has been pulled into position between the two sets of gripping jaws to the left (Fig. 1) of the jaws 28, since the set of jaws 29 will prevent its movement to the right (Fig. 1). The amount of wire solder advanced at each operation of the oscillatable member 17 may be accurately controlled by regulating the set screw 18 which limits the movement of the member 17.

While this invention has been described as relating to a specific type of mechanism, it is to be understood that modifications and adaptations of the mechanism may be made without departing from the scope of the invention, which is to be limited only by the scope of the appended claims.

What is claimed is:

1. In combination with a soldering iron, a movable means for supporting solder adjacent to the iron said movable means being movable with the solder when the solder is moved into engagement with the iron, gripping jaws mounted upon the movable means for permitting solder to be moved therethrough in one direction, means for pivotally supporting the movable means, a pair of gripping jaws mounted upon the supporting means for permitting the solder to move therethrough in one direction, resilient means for normally urging the movable means away from the soldering iron, and means for regulating the amount of movement of the movable means in one direction.

2. In combination with a soldering iron, a movable means for supporting solder adjacent to the iron, said movable means being movable with the solder when the solder is moved into engagement with the iron, gripping jaws mounted upon the movable means for permitting solder to be moved therethrough in one direction, means for supporting the movable means, gripping jaws mounted upon the supporting means for permitting the solder to move therethrough in one direction, and means for normally urging the movable means away from the soldering iron.

3. In combination with a soldering iron, a member movable relative to the iron and having means for guiding solder therethrough and into the path of movement of work to be soldered whereby the work presses the solder into engagement with the iron and thereby causes a movement of the member toward the iron, means for effecting a return movement of said member, and means operated by said movements of said member for feeding solder from a supply thereof.

DARRELL D. ROCK.